Nov. 20, 1951 T. R. McGOWAN 2,575,825
BRAKE MECHANISM
Filed March 27, 1948 9 Sheets-Sheet 1

Fig. 1a.

INVENTOR.
Thomas R. McGowan
BY
HIS ATTORNEY

Nov. 20, 1951 T. R. McGOWAN 2,575,825
BRAKE MECHANISM
Filed March 27, 1948 9 Sheets-Sheet 3

Fig. 2a.

INVENTOR.
Thomas R. McGowan
BY
HIS ATTORNEY

Nov. 20, 1951 T. R. McGOWAN 2,575,825
BRAKE MECHANISM
Filed March 27, 1948 9 Sheets-Sheet 4

Fig. 2b.

INVENTOR.
Thomas R. McGowan
BY
HIS ATTORNEY

Nov. 20, 1951     T. R. McGOWAN     2,575,825
BRAKE MECHANISM Filed March 27, 1948     9 Sheets-Sheet 7

Fig. 4b.

INVENTOR.
Thomas R. McGowan
BY
HIS ATTORNEY

Nov. 20, 1951  T. R. McGOWAN  2,575,825
BRAKE MECHANISM
Filed March 27, 1948  9 Sheets-Sheet 9

Fig. 5b.

INVENTOR.
Thomas R. McGowan
BY
HIS ATTORNEY

Patented Nov. 20, 1951

2,575,825

UNITED STATES PATENT OFFICE 2,575,825

BRAKE MECHANISM

Thomas R. McGowan, Pittsburgh, Pa., assignor to The American Brake Company, Swissvale, Pa., a corporation of Missouri Application March 27, 1948, Serial No. 17,421

1 Claim. (Cl. 188—199)

My invention relates to brake mechanism for railway rolling stock, and particularly to brake mechanism for use on a truck having at least three wheels on each side.

My invention is shown and described herein as applied to a six-wheel motor truck for a diesel electric locomotive. While certain features of my invention are of particular utility in connection with such a truck, other features are of general utility.

In a motor truck of the type described, most of the space between the wheels is largely taken up by the driving motors and their associated structures. It is therefore necessary to mount most of the brake rigging outside of the wheels. In order to provide adequate clearance between the brake mechanism and roadside structures, the brake mechanism must be made as small and compact as possible. Since the largest unit in the brake mechanism is the brake operating cylinder, it is desirable to use as few cylinders as possible. If one cylinder is used to operate brake shoes on several wheels, it must be connected to the brake shoes which are located remote from it by a rather long and complex linkage, requiring a somewhat elaborate guiding and supporting structure. Such guides and supports introduce friction which resists movement of the various parts of the linkage.

Friction in a brake rigging of the type in question presents no substantial problem during application of the brakes, because the power available to apply the brakes is more than ample to overcome any friction which may be encountered. However, friction in the linkage must be taken into account in considering the releasing movement of the brakes. Railway vehicle brakes are commonly arranged so that gravity tends to move them to their released positions. It is also common to provide a spring acting on the piston of the brake operating cylinder in a releasing direction.

In a long and complex linkage such as that described above, gravity and the release spring in the brake cylinder do not always insure equal releasing travel of all the brake shoes. Wherever an equalizer lever is used in the linkage and the friction forces are different between the equalizer and the several shoes, then it is possible for one shoe to be retarded in its releasing travel more than another. The releasing forces due to gravity and the releasing spring in the operating cylinder may then be expended in causing an overtravel of the shoe which is less retarded by friction, while the shoe which is retarded travels less than its designed releasing distance. The frictionally retarded shoe may under such conditions be left in a position wherein it may engage the wheel, resulting in undesirable wear of both shoe and wheel.

It is therefore an object of my invention to provide a brake rigging of the type described including improved guiding and supporting structures.

Another object is to provide an improved brake releasing spring arrangement.

A further object is to provide such a brake releasing spring arrangement for use in connection with a brake rigging wherein a single cylinder operates a plurality of brake shoes.

A further object is to provide an improved brake mechanism of the type shown and claimed in Letters Patent of the United States No. 2,427,956, granted to William A. Gantner on September 23, 1947, for Brake Rigging.

According to my invention, I provide each wheel with a single brake shoe, and I employ a brake cylinder for actuating the shoes associated with three wheels on one side of the truck. The piston rod of each brake cylinder is pivotally connected to the upper end of a brake cylinder lever which is secured at its lower end to a crank pivotally mounted on the truck frame. Each crank is connected through a push connector with a first horizontal equalizer lever at a point intermediate its ends. This equalizer lever is operatively connected at its inner end with a brake shoe for the rear wheel of the truck. The outer end of this equalizer lever is operatively connected by means of a pull rod to a slidably guided pull link which extends longitudinally of the truck between the first and second wheels. A second equalizer lever has its outer end pivotally connected to the pull link and its inner end operatively connected to a brake shoe associated with the front wheel of the truck. A second push connector connects an intermediate point on the second equalizer lever with an intermediate point on a third lever whose outer end is pivotally attached to the truck frame and whose inner end is operatively connected to the brake shoe on the center wheel of the truck.

In one modification of my invention, I provide an improved guide and support bracket for the first equalizer lever. This bracket cooperates with an extension at one end of the push connector. The end opposite the bracket is supported by the crank so that the connector is supported at its opposite ends. I also provide improved guide and support means for the pull link, by which that link is guided and supported at two spaced points. An improved brake releasing structure is also provided, including, in addition to the releasing spring in the brake cylinder, an additional spring having, in effect, a resilient lost motion connection with the first push connector and a slip friction connection with the first equalizer lever. This additional releasing spring insures that the equalizer lever returns to a definite angular position with respect to the push connector when the brakes are released. Since the releasing spring of the brake cylinder insures that the intermediate point of the equalizer lever returns to the same position each time, it may be seen that the two releasing springs together cooperate to return all parts of the brake rigging to their preselected released positions. The slip-friction connection compensates for wear of the brake shoes and wheels and insures that all the shoes are operated through the same distances when the brakes are released.

In another modification of my invention, I use a single supporting bracket for supporting both the first push connector and the pull rod. Also, I use a single supporting bracket for one point on the pull link and the outer end of the third lever. Also, in this modification, I connect the additional brake releasing spring between the pull link and the frame, providing a yieldable lost motion connection between the spring and the pull link and a slip-friction connection between the spring and the frame.

Other objects and characteristic features of my invention will become apparent as the description proceeds.

I shall describe two forms of brake rigging embodying my invention, and shall then point out the novel features thereof in claims.

In the accompanying drawings, Figs. 1a and 1b together form a side elevational view of a diesel electric locomotive truck provided with one form of brake mechanism embodying my invention.

Figure 1A:
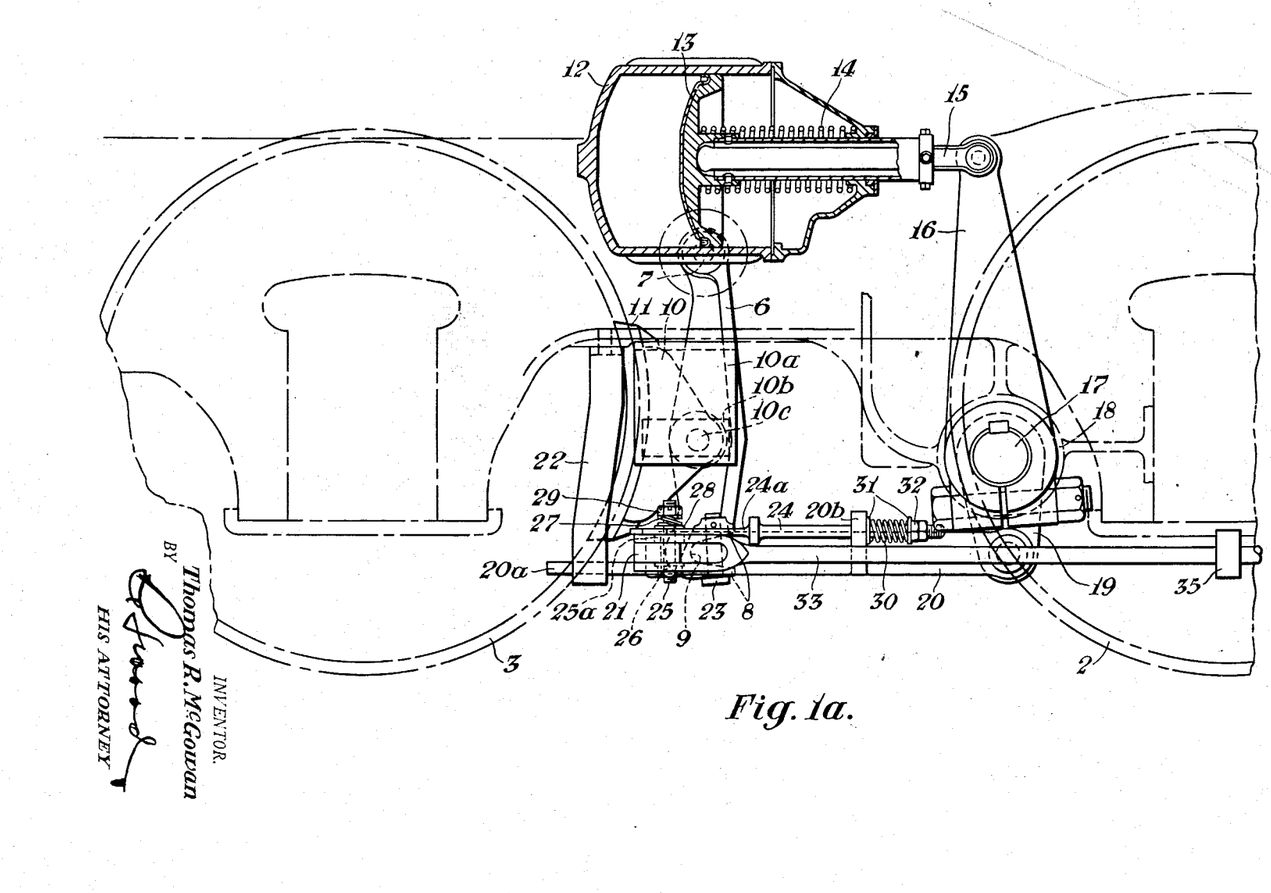
Figure 1B:
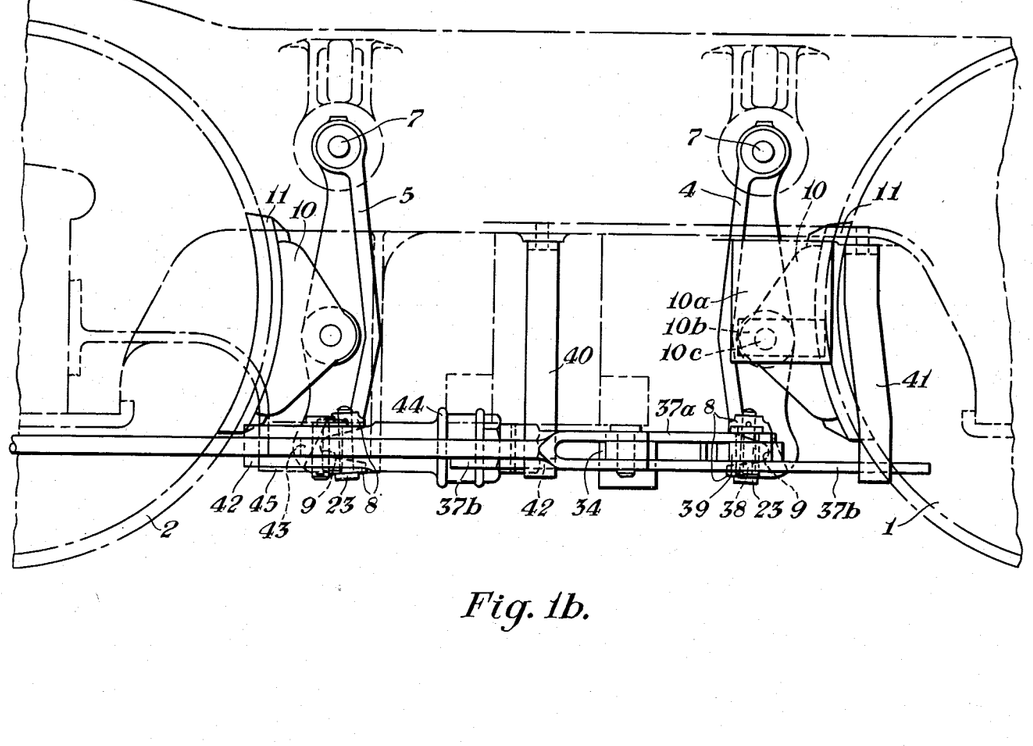
Figure 2A:
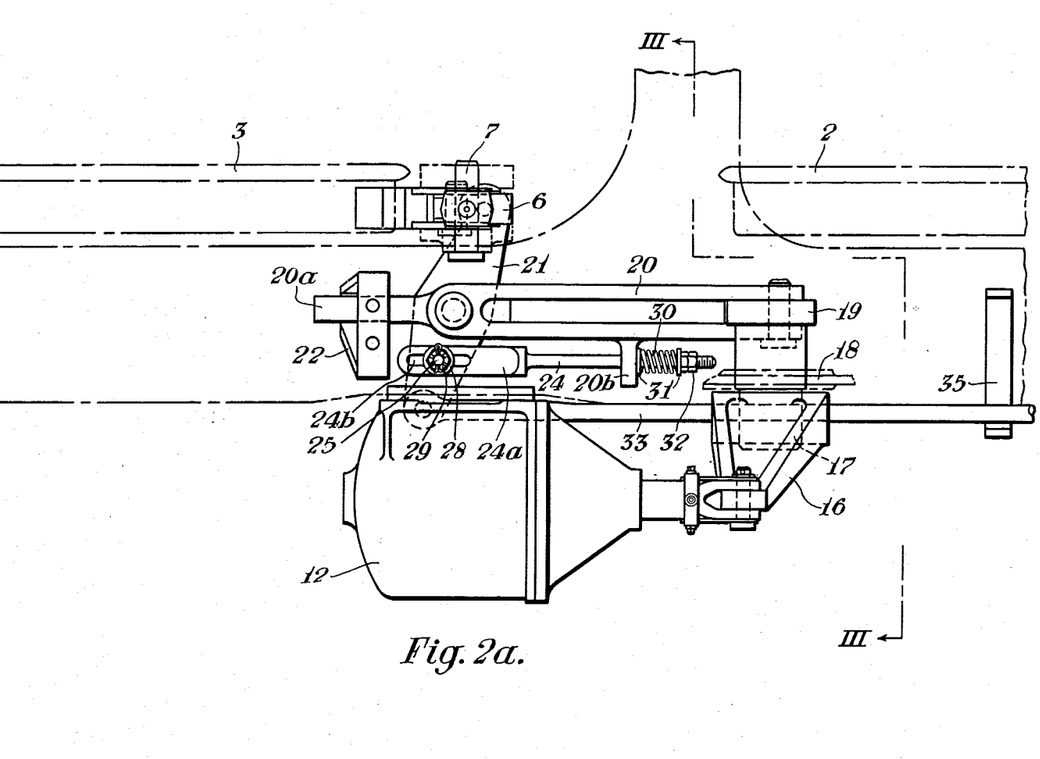
Figs. 2a and 2b together form a top plan view of the brake rigging of Figs. 1a and 1b, showing that portion which is attached to one side of the truck, it being understood that the rigging on the other side of the truck is the counterpart of that shown.
Figure 2B:
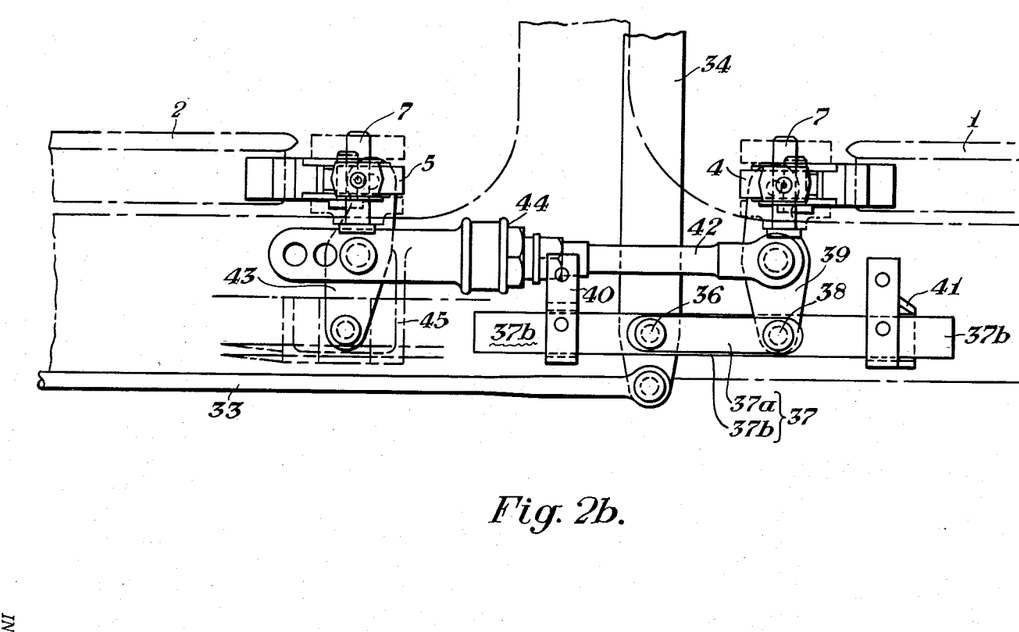
Figure 3:
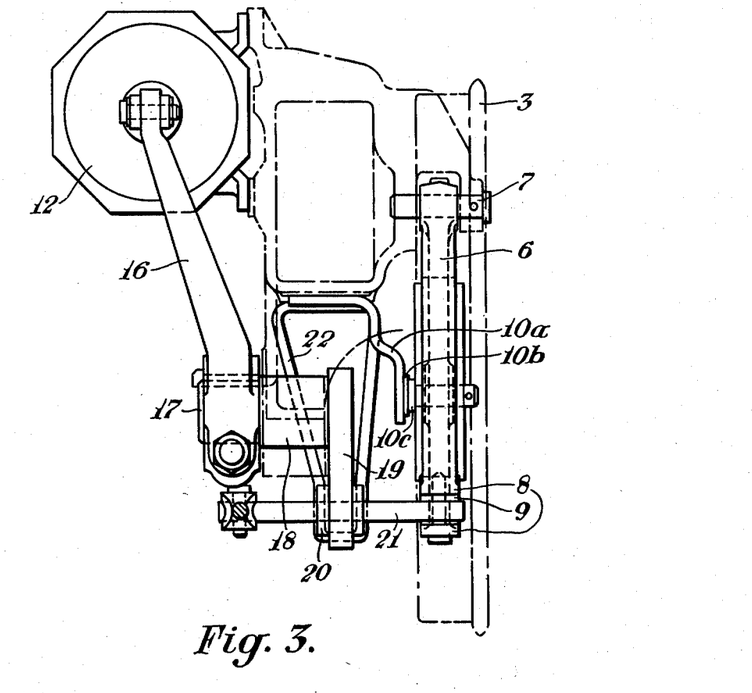
Fig. 3 is a cross sectional view taken on the line III—III of Fig. 2a, looking in the direction of the arrows, with certain parts omitted for the sake of clarity.
Figure 4A:
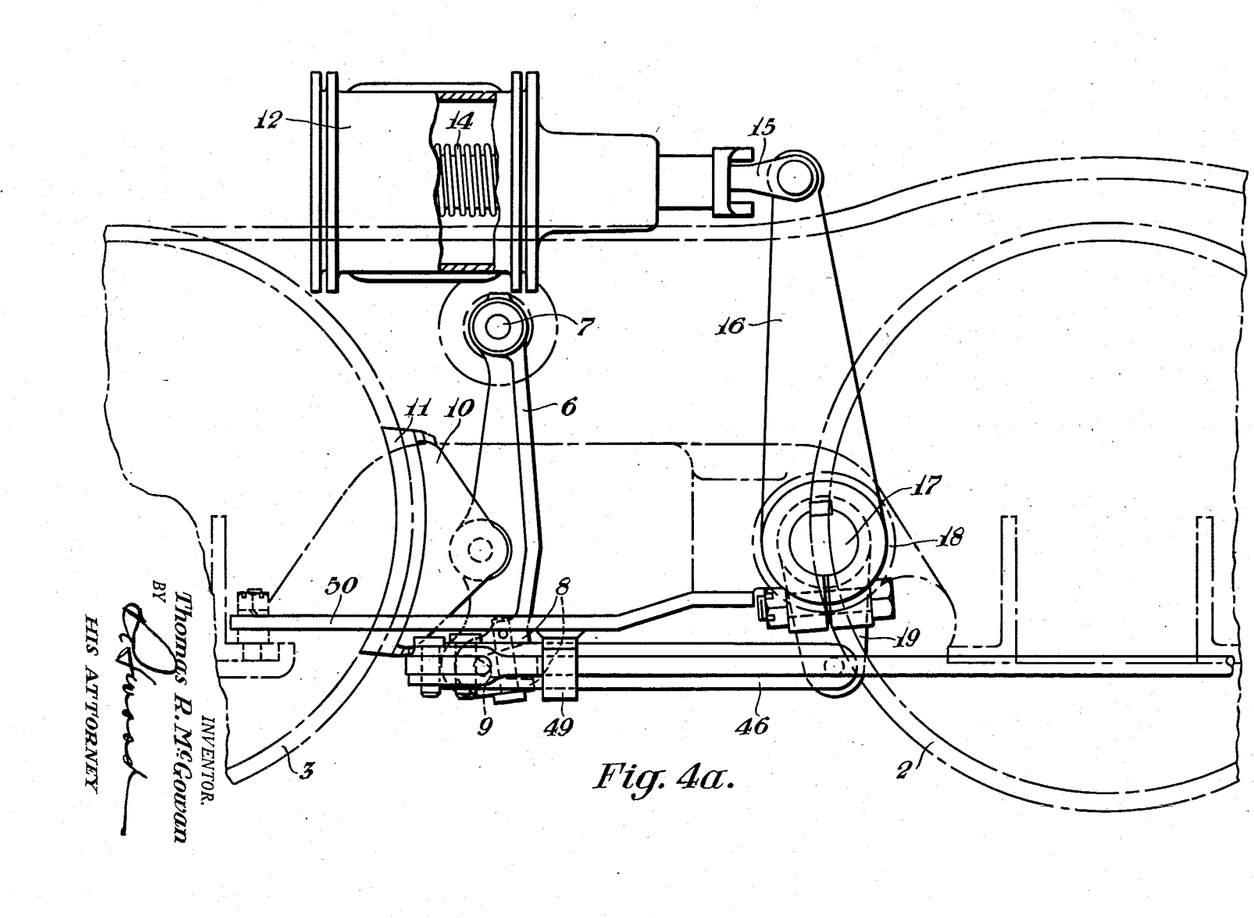
Figs. 4a and 4b together form a side elevational view of a diesel electric locomotive truck provided with another form of brake rigging embodying my invention.
Figure 4B:
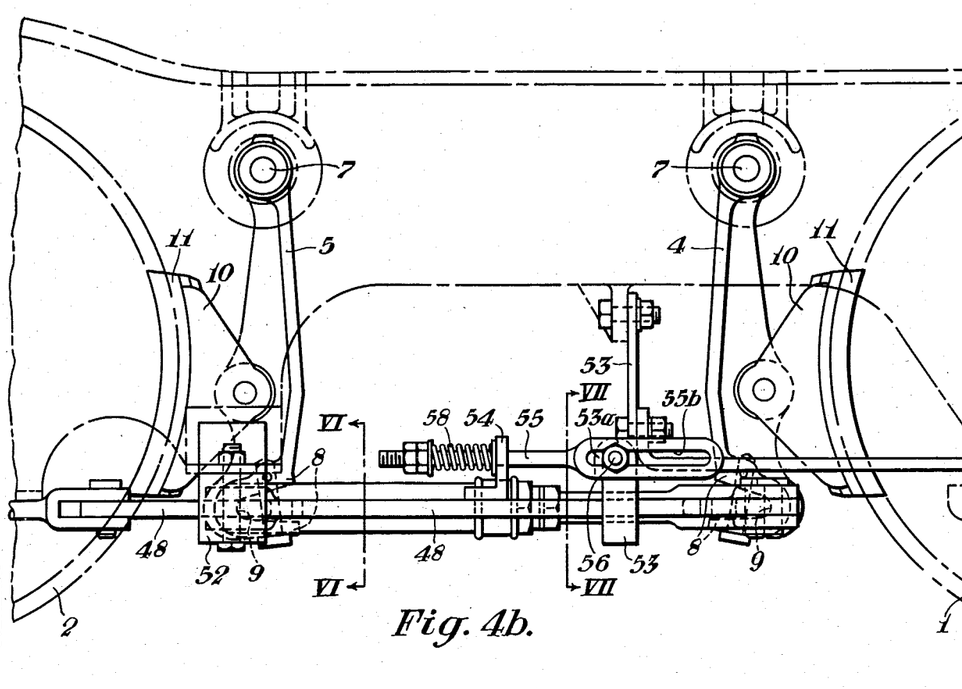
Figure 5A:
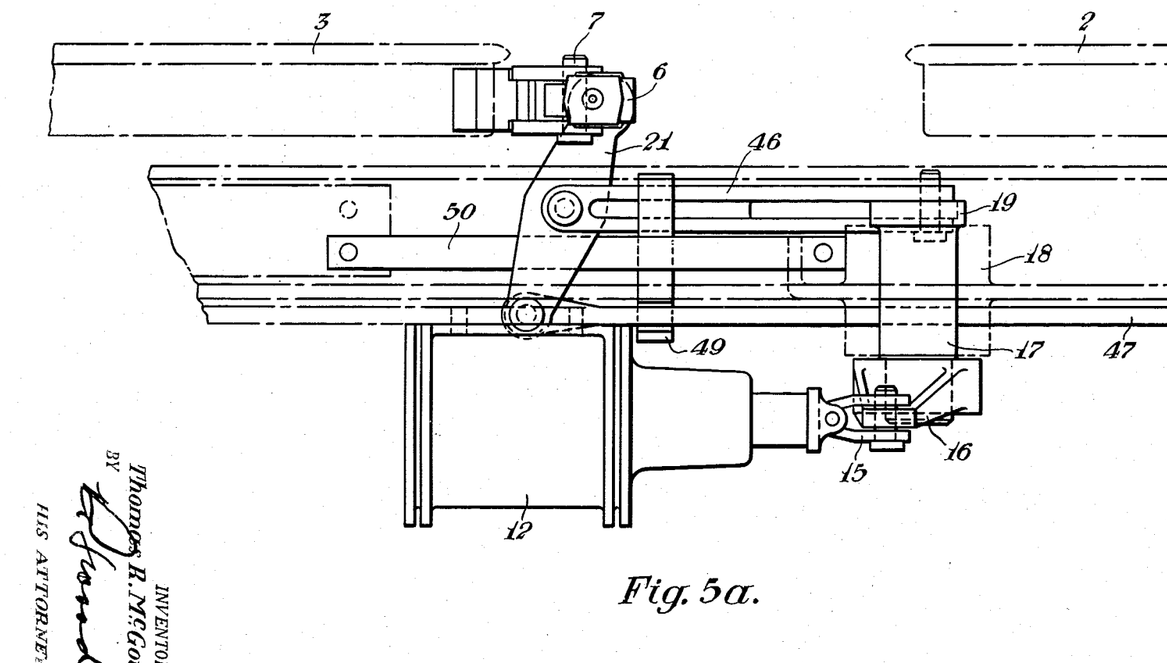
Figs. 5a and 5b together form a top plan view of the brake mechanism in Figs. 4a and 4b, showing the brake mechanism for one side of the truck only.
Figure 5B:
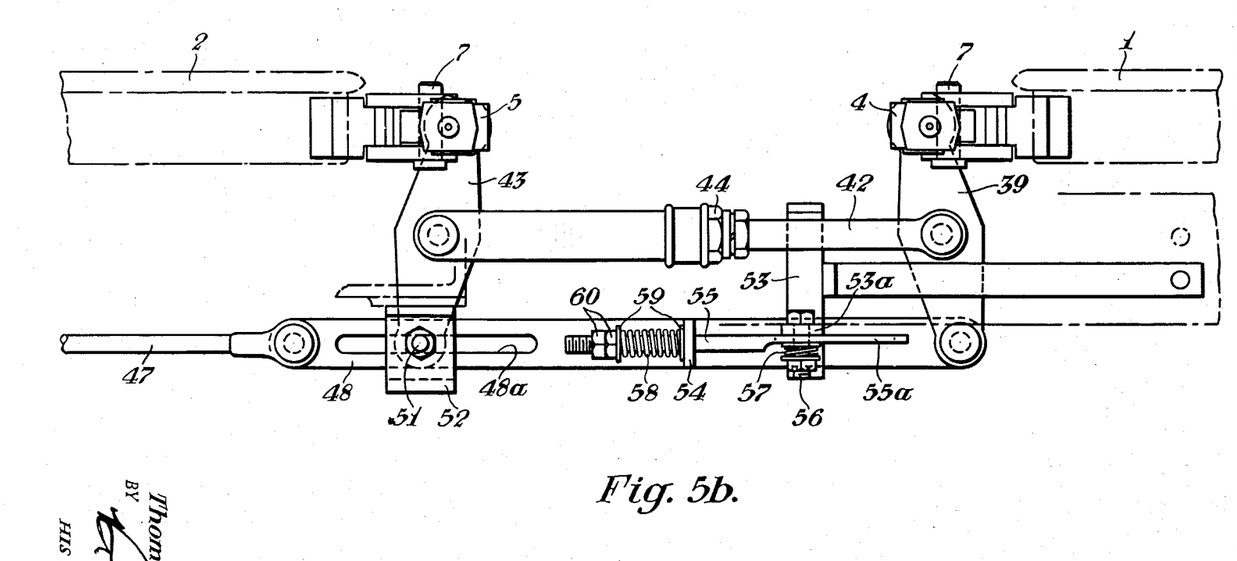

*Figs. 1 to 3*

Referring to the drawings, the reference characters 1, 2, and 3 designate respectively the front, middle, and rear wheels at the right-hand side of a six-wheel motor truck for a diesel electric locomotive. The left side of the truck is not shown, since it is provided with brake rigging which is a counterpart of that described.

The brake rigging comprises a hanger lever 4 disposed at the rear side of the front wheel 1, a hanger lever 5 disposed at the forward side of the middle wheel 2, and a hanger lever 6 disposed at the forward side of the rear wheel 3. The hanger levers are pivotally attached at their upper ends to the truck frame by means of pivot pins 7, and each hanger lever is provided at its lower end with spaced jaws 8 which form a recess 9. A brakehead 10 is pivotally attached to each hanger lever intermediate its ends, and each brakehead carries a brake shoe 11 for engagement with the tread of the associated wheel. The brakeheads 10 for wheels 1 and 3 are provided with stationary brakehead guides 10a (see Figs. 1 and 3) having wear plates 10b which engage the brakehead pins 10c and thereby limit the lateral movements of the brakeheads.

The several brake shoes are operated into and out of engagement with their associated wheels by means of a fluid pressure motor including a cylinder 12 having a piston 13 movable therein. A spring 14 biases the piston 13 in a brake releasing direction. The piston 13 operates a piston rod 15, which is operatively connected to the upper end of a brake cylinder lever 16. The brake cylinder lever 16 is pivotally supported on a crankshaft 17 which extends through a bearing 18 in the truck frame. On the inside of the bearing 18, the crankshaft 17 carries a crank arm 19 which is pivotally connected to one end of a push connector 20. Near its other end the push connector 20 is pivotally connected to an intermediate point on an equalizer lever 21 mounted horizontally and extending transversely of the truck. The push connector 20 is provided with an extension 20a which extends beyond the lever 21 and is slidably supported by a bracket 22 attached to the truck frame. The push connector 20 is therefore supported and guided against lateral movement at one end by the bracket 22 and at its opposite end by the crank arm 19. These widely spaced supports provide a mechanical advantage for the reactive guiding forces at those points over any laterally displacing force acting on the push connector 20 through the equalizer lever 21.

The inner end of equalizer lever 21 is secured within the recess 9 in the hanger lever 6 by means of a pivot pin 23 which extends through registered openings formed in the equalizer lever and in the jaws 8 of the hanger.

The push connector 20 is provided with a laterally extending lug 20b which is apertured to loosely receive a spring rod 24. The left end of spring rod 24, as it appears in the drawings, is flattened, as at 24a, and is provided with a slot 24b. A collar bolt 25 is fastened in a suitable aperture in lever 21 by means of a castellated lock nut 26, so that the flange or collar 25a of the collar bolt is held against the upper surface of the lever. The upper end of the collar bolt 25 extends through the slot 24b in spring rod 24, and carries a coil spring 27 which is held in compression between a washer 28 and a lock nut 29. The spring 27 holds the flattened portion 24a of spring rod 24 frictionally between washer 28 and collar 25a, thereby providing a slip-friction connection between spring rod 24 and equalizer lever 21. A coil spring 30, hereinafter referred to as an auxiliary brake releasing spring, surrounds the spring rod 24 on the opposite side of lug 20b from the equalizer lever 21. The spring 30 is retained between washers 31. One washer 31 rests against the lug 20b. The other washer 31 is held on the rod 24 by means of lock nuts 32.

The outer end of equalizer lever 21 is pivotally connected to one end of a pull rod 33, which extends forwardly of the truck and is pivoted at its opposite end to the right end of an intermediate beam 34, which extends transversely of the truck.

Near its center, the pull rod 33 is slidably supported and guided by means of a bracket 35.

The intermediate beam 34 is pivoted by means of a pin 36 to a pull link 37. The pull link 37 comprises upper and lower straps 37a and 37b, held together by means of pin 36 and a pin 38 which connects the pull link 37 to the outer end of an equalizer lever 39. The upper strap 37a extends only a short distance beyond the pins 36 and 38. The lower strap 37b of the guide rod 37 extends considerably beyond the ends of the upper strap 37a, and has its ends slidably supported by brackets 40 and 41, which are attached to the truck frame. These widely spaced supporting brackets for the pull link 37 provide a considerable mechanical advantage for the reactive guiding forces over any transversely acting displacing forces which may act on the pull link. The lower strap 37b is shown in Fig. 2b as somewhat wider than strap 37a in order to make the drawing clearer. It should be understood that the straps may both be the same width, or if desired, the upper strap may be wider than the lower.

The inner end of equalizer lever 39 is connected by means of a pin 23 to the lower end of brake hanger 4. A push connector 42 is pivotally connected to an intermediate point on the equalizer lever 39, and has its opposite end pivotally connected to an intermediate point on a lever 43. The push connector 42 includes a slack adjuster 44 of well-known construction. The outer end of lever 43 is pivoted on a fixed support 45 attached to the truck frame. The inner end of lever 43 is pivotally connected to the lower end of hanger 5 by means of a pivot pin 23.

Operation of Figs. 1 to 3

When it is desired to apply the brakes, fluid pressure is admitted to cylinder 12 and moves the piston 13 to the right, carrying with it the piston rod 15 and rotating the brake cylinder lever 16 and the crank 19 clockwise as viewed in Fig. 1. This drives the push connector 20 toward the rear of the truck. Since the friction load on the outer end of the equalizer lever 21 is greater than the friction load on the inner end, this motion of the push connector first rotates the equalizer lever about the outer end as a fulcrum, thereby moving the inner end until the brake shoe 11 engages wheel 3. Thereafter the equalizer lever pivots about its inner end, and the outer end moves rearwardly, carrying the pull rod 33, intermediate beam 34, and pull link 37, along with it. This causes equalizer lever 39 to pivot about the push connector 42 until its inner end moves far enough to cause engagement of brake shoe 11 with wheel 1. Thereafter the equalizer lever 39 pivots about its inner end, carrying the push connector 42 rearwardly and causing the lever 43 to pivot in a counterclockwise direction (as viewed in Fig. 2b) and to move the brake shoe 11 into engagement wtih wheel 2. Although the brake shoe for wheel 3 may touch its associated wheel first, the brake shoe for wheel 1 second and the brake shoe for wheel 2 last, it should be appreciated that no substantial braking forces are applied to any of the wheels until all of the brake shoes are in engagement with their respective wheels. The braking force applied at either end of either equalizer lever can be no greater than the reactive force on the opposite end. The reactive forces cannot reach any appreciable value until the brake shoes are all engaging their associated wheels.

It should be noted that, although the initial movement of equalizer lever 21 is in a direction to relieve the compressive force on spring 30, the final movement of the equalizer lever to braking position compresses spring 30.

When it is desired to release the brakes, the pressure in cylinder 12 is released. The spring 14 then moves piston 13 and its associated parts back to their released positions. The spring 14 therefore insures that the intermediate point on equalizer lever 21 is restored to its normal position. If the additional brake releasing spring 30 were not provided, it might be possible for either or both of the brake shoes associated with the front wheels 1 and 2 to stick in or near their braking positions because of frictional forces between the various elements of the linkage and their respective guides. In case of such a sticking, the main release spring 14 could still return the push connector 20 to its normal position. The inner end of equalizer lever 21 would then travel slightly beyond its normal position to compensate for the sticking of pull rod 33. However, when the additional spring 30 is provided, it insures that the equalizer lever 21 returns to its normal angular position with respect to push connector 20. Therefore, it may be seen that the main releasing spring 14 and the additional spring 30 cooperate to return all parts of the linkage to their brake releasing positions when the pressure is removed from cylinder 12.

The spring 30 is so constructed that its coils close solidly upon each other as soon as the spring rod 24 has traveled a sufficient distance to permit application of the brake shoes 11 to the wheels 1 and 2. After the wheels and brake shoes have become worn, the braking position required of the equalizer lever 21 will be somewhat displaced from its original braking position. After the coils of spring 30 have engaged each other, if the brake shoes have still not engaged their associated wheels, the equalizer lever 21 will be rotated additionally in a clockwise direction by the push connector 20. At this time, the spring rod 24 cannot move rearwardly with respect to push connector 20. The slip-friction connection between rod 24 and equalizer lever 21 then allows the rod to slip over the equalizer lever until the brakes are applied. When the brakes are again released, the lever 21 travels through the same distance as before due to the action of springs 14 and 30, but its released position is different, because of the movement of the slip-friction connection.

The slip-friction connection thereby insures that the distance between the braking positions of the brake shoes and their released positions remains substantially constant, even though the braking positions themselves may vary because of wear at the shoes and wheels.

Figs. 4 to 7

The brake mechanism shown in these figures is generally similar to that shown in Figs. 1 to 3. Elements in these figures which are the counterparts of elements in Figs. 1 to 3 have been given the same reference characters. These figures differ from the rigging shown in Figs. 1 to 3 chiefly in the details of the driving linkage which operates the several brake hangers, the guiding and supporting arrangement for that linkage, and in the location of the auxiliary brake releasing spring.

The push connector 46, which corresponds generally to the push connector 20 of Fig. 1, differs from the push connector 20 in that it is not provided with a supporting extension such as 20a nor with a laterally extending lug such as 20b.

The outer end of equalizer lever 21 is connected to one end of a pull rod 47 whose oppostite end is pivoted on a pull link 48. The push connector 46 and the pull rod 47 are both supported on a single bracket 49 carried by a strap 50 which is attached at its ends to the truck frame.

Figure 6:
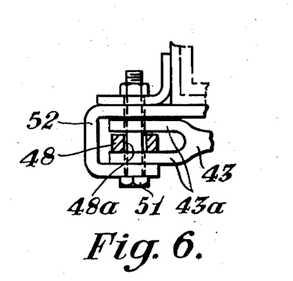
Figs. 6 and 7 are cross sectional views taken on the line VI—VI and VII—VII, respectively, of Fig. 4b, looking in the direction of the arrows, showing details of the guiding and supporting mechanism.
Figure 7:
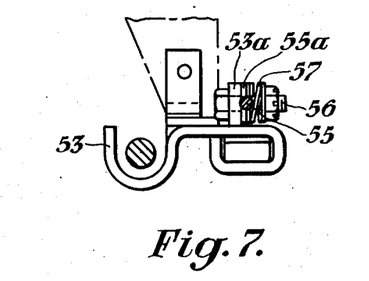

The pull link 48 is slotted at 48a (see Fig. 5b) to receive a pin 51 which extends between the sides of a generally U-shaped bracket 52 (see Fig. 6). The lever 43 is bifurcated at 43a, and its bifurcated end straddles the guide rod 48. The bifurcated end of lever 43 is provided with apertures which receive the pin 51, so that the pin 51 forms a pivot for lever 43.

The pull link 48 also is supported and guided by a bracket 53 attached to the frame of the truck. An upstanding lug 54 is attached to the upper surface of the pull link 48. The lug 54 is apertured to loosely receive a spring rod 55. The right end of spring rod 55 is flattened, as at 55a, and slotted, as at 55b, to receive a pin 56. The pin 56 carries a spring 57 which holds the spring rod 55 in frictional engagement with a lug 53a formed on the bracket 53. The construction of pin 56 and its associated parts is generally similar to the construction of pin 25 and its associated parts in Figs. 4 and 5. A release spring 58 is coiled around the spring rod 55 on the side opposite the bracket 53. The ends of spring 58 are retained by washers 59, one adjacent the lug 54 and the other held on the spring 55 by means of lock nuts 60.

*Operation of Figs. 4 to 7*

The operation of the rigging shown in Figs. 4 to 7 is generally similar to that of the rigging shown in Figs. 1 to 3, and it is believed that additional detailed explanation is unnecessary. However, it should be pointed out that the release spring 58 insures a definite releasing travel of the pull link 48 with respect to the bracket 53, and hence with respect to the truck frame. It thereby insures a definite releasing position of the outer end of equalizer lever 21. As in the case of Figs. 1 to 3, the main releasing spring 14 associated with the brake cylinder insures that an intermediate point of equalizer lever 21 is restored to a definite releasing position. Since the releasing positions of two points on the equalizer lever 21 are thus determined, it is evident that its releasing position is definitely established and that the releasing positions of all the parts of the linkage are likewise established.

The operation of the release spring 58 and of the slip-friction connection associated with pin 56 is substantially the same as the operation of release spring 36 and the slip-friction connection associated with pin 25 in Figs. 1 to 3.

In this modification of my invention, the releasing spring 58 is intimately associated with the particular part of the linkage most likely to become struck. That is, the pull link 48, since it is slidably guided at two spaced points, is subject to greater sliding friction than any other part of the linkage. By virtue of its location with respect to the pull link 48, the spring 58 is particularly effective in overcoming that sliding friction.

Although I have herein shown and described only two forms of brake rigging embodying my invention, it is understood that various changes and modifications may be made therein within the scope of the appended claim without departing from the spirit and scope of my invention.

Having thus described my invention, what I claim is:

In a brake mechanism for one side of a six wheel truck comprising a brake cylinder secured to the truck frame, a brake cylinder lever secured at its lower end to a crank pivotally attached to the truck frame and operatively connected at its upper end with said brake cylinder, a push connector connected at one end to said crank and slidably supported at the other end, a first transversely extending equalizer lever pivotally connected intermediate its ends with said push connector intermediate its ends and operatively connected at its inner end with a brake shoe for applying a brake to the rear one of the truck wheels, a pull rod connected to the outer end of said equalizer lever and extending along the truck toward the front of the truck, an intermediate beam extending transversely of the truck between the front and middle wheel of the truck and connected at one end to the other end of said pull rod, a pull link slidably supported for longitudinal movement with respect to the truck and operatively connected with said intermediate beam in supporting relation thereto, a second transversely extending equalizer lever operatively connected at its outer end with said pull link and operatively connected at its inner end with a brake shoe for applying a brake to the front wheel of the truck, a third transversely extending lever pivotally attached at its outer end to the truck frame and operatively connected at its inner end with a brake shoe for applying a brake to the middle wheel of the truck, and a second push connector connected at its ends with said second and third levers intermediate their ends, the combination with the aforementioned instrumentalities of means for insuring the release of the brakes for the first and second wheels irrespective of friction in the linkage comprising a lug projecting laterally from said first push connector and having a hole therein, a spring rod extending with clearance through said hole and provided at one end with a flattened portion having a longitudinal slot therein, a bolt extending through said first equalizer lever and through said slot, spring means on said bolt for causing frictional engagement between the spring rod and the lever, a spring retainer fixed on the spring rod on the side of the lug opposite the equalizer lever, and a releasing spring on the rod between the lug and said retainer so arranged that its coils solidly engage each other after a predetermined deflection thereof so that further movement of the push connector after the spring coils engage each other cause slippage of the spring rod relative to the lever to compensate for wear of the brake shoes and wheels and maintain the same releasing travel of the brake shoes.

THOMAS R. McGOWAN.

REFERENCES CITED

The following references are of record in the file of this patent:

UNITED STATES PATENTS

| Number | Name | Date |
|---|---|---|
| 1,227,955 | Sauvage | May 29, 1917 |
| 1,836,245 | Hedgcock | Dec. 15, 1931 |
| 2,210,038 | Mueller | Aug. 6, 1940 |
| 2,402,389 | Gantner | June 18, 1946 |
| 2,427,956 | Gantner | Sept. 23, 1947 |